United States Patent

Liebetrau et al.

[11] Patent Number: 5,988,930
[45] Date of Patent: Nov. 23, 1999

[54] CONNECTING APPARATUS FOR PROFILE MEMBERS

[75] Inventors: Christoph Liebetrau, Menziken; Kaspar Schindler, Unterkulm, both of Switzerland

[73] Assignee: Inventio AG, Hergiswil NW, Switzerland

[21] Appl. No.: 08/966,518

[22] Filed: Nov. 10, 1997

[30] Foreign Application Priority Data

Nov. 11, 1996 [EP] European Pat. Off. ............. 96810764

[51] Int. Cl.⁶ ....................................................... F16B 7/00
[52] U.S. Cl. ........................ 403/292; 403/279; 403/282; 403/348; 411/85
[58] Field of Search ..................................... 403/292, 279, 403/282, 285, 293, 298, 281, 381, 72, 348, 427, 21, 2; 411/84, 85, 104, 966; 256/1, 13.1

[56] References Cited

U.S. PATENT DOCUMENTS

| 2,345,650 | 4/1944 | Attwood | 403/21 |
| 2,696,139 | 12/1954 | Attwood | 411/427 |
| 2,737,268 | 3/1956 | Smith | 403/21 |
| 3,059,589 | 10/1962 | Schreyer | 403/72 X |
| 4,830,531 | 5/1989 | Condit et al. | 403/348 |

FOREIGN PATENT DOCUMENTS

| 0 671 566 | 9/1995 | European Pat. Off. . |
| 1 372 425 | 8/1962 | France . |
| 9 115 943 | 4/1992 | Germany . |

Primary Examiner—Lynne H. Browne
Assistant Examiner—David E. Bochna
Attorney, Agent, or Firm—MacMillan, Sobanski & Todd, LLC

[57] ABSTRACT

A connecting apparatus for producing a firm, releasable and reproducible mechanical interconnection of two profile member ends includes a groove strip (6) with threaded holes, an apertured strap (1) with through holes and screws (7), wherein the profile members (4) to be connected have mounting grooves (5) for the reception of the groove strip (6). The apertured strap (1) has, formed on a support surface thereof, penetration elements (3) which project from the surface and which on tightening of the screws (7) penetrate in a cold-deforming manner into the material of the profile members (4) to be connected and thus yield a multiply mechanically positive connection. The penetration elements (3) are formed as grater gashes.

12 Claims, 2 Drawing Sheets

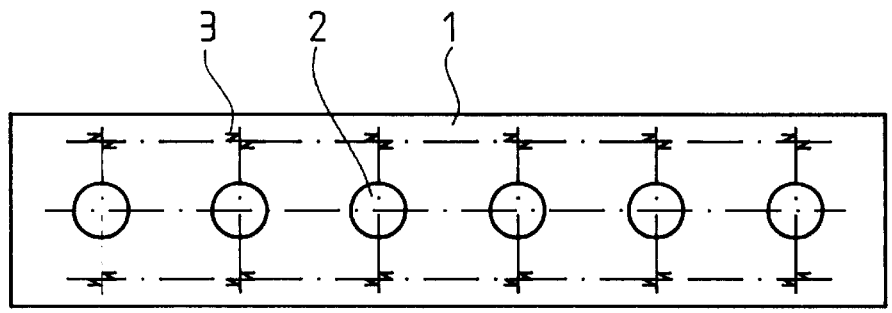
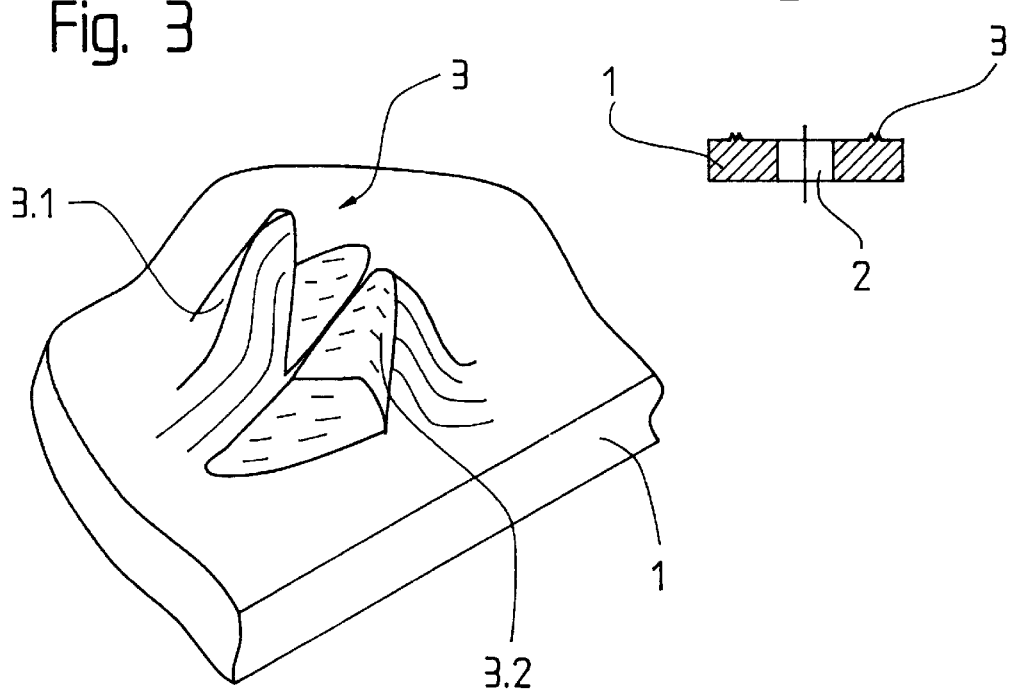
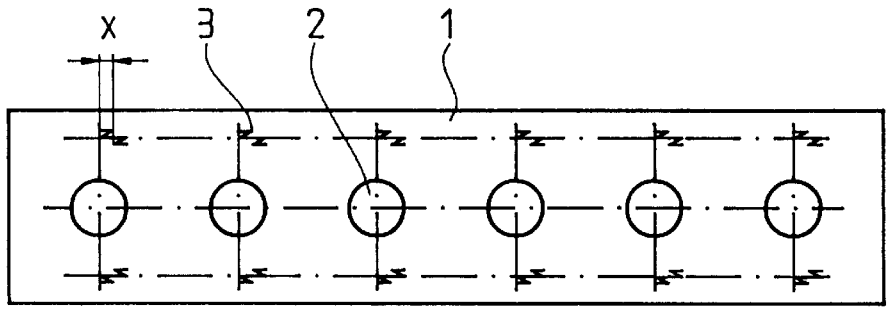

CONNECTING APPARATUS FOR PROFILE MEMBERS

BACKGROUND OF THE INVENTION

The present invention relates to a connecting apparatus for the production of a firm, releasable and reproducible mechanical interconnection of two profile member ends, substantially consisting of a groove strip, an apertured strap and screws, wherein the profile member ends to be connected have mounting grooves for the reception of groove strips.

Connecting means and connecting techniques of the aforesaid kind are generally known and fulfill in manifold variants the needs of a normally loaded mechanical connection. The required holding force of such a connection normally loaded in tension is produced frictionally by means of screws, which is achieved by firm tightening of at least one respective screw at each profile member end. The frictional force, and thus the holding force of the connection, can be influenced up to a certain limit by means of the number and dimension of the screws and of the material matching. In the case of stronger loading, the effort for a connection based only on a frictional couple is too high or for technical reasons, for example great occupation of space, even impossible.

Offering itself for the production of mechanically positive connections is the equally known technique with apertured straps, through holes at the parts to be connected, together with screws, rivets or bolts passing through. However, in this form of connection the parts to be connected must be provided with through holes, which requires corresponding additional work to prepare each profile member end.

SUMMARY OF THE INVENTION

The present invention concerns a connecting apparatus which does not have the aforesaid disadvantages and which enables, without appreciable extra effort, a permanent, vibration-proof mechanical connection.

The invention is distinguished in that on tightening of the connecting screws, a part of the connecting strap penetrates in a cold-deforming manner into the surface of the parts to be connected and thereby produces an additional mechanically positive connection at at least one position.

Those parts of the connecting strap which penetrate into the surface are formed as penetration elements, which project on the surface of the connecting strap, in the form of pointed projecting grater gashes opposing the tension direction and the compression direction.

The material of the apertured strap has approximately twice the hardness of the material of the parts to be connected.

The arrangement of the grater gashes and holes allows a second connecting operation with the same parts and with an equal mechanically positive connecting impression as in the case of the first time.

The groove strip has elevated side edges.

The projecting penetration elements are arranged on a line at both sides of the holes in the strap, which line coincides with the elevated side edges of the groove strip.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a bottom plan view of an apertured strap with the arrangement of holes and projecting penetration locations in accordance with the present invention;

FIG. 2 is a cross-sectional view of the apertured strap shown in the FIG. 1 taken on a hole center line;

FIG. 3 is an enlarged, perspective view of a portion of the apertured strap shown in the FIG. 1 showing one of the projecting penetration locations;

FIG. 8 is a bottom plan view of an alternate embodiment of the apertured strip shown in the FIG. 1.

DESCRIPTION OF THE PREFERRED EMBODIMENT

In the FIG. 1, there is shown an apertured strap 1. An even number of through holes 2 are formed therein and arranged centrally in a longitudinal row. Similarly, two groups of projecting penetration elements 3 are arranged in respective longitudinal rows on opposite sides of the through holes 2 at the level of the hole center line near the through holes.

The penetration elements 3 are formed as double points projecting from the strap surface as shown in the FIG. 2 which is a cross-section through one of the through holes 2 of the apertured strap 1.

The FIG. 3 shows an enlarged representation of one of the penetration elements 3 and the practical embodiment thereof in the form of grater gashes 3.1 and 3.2 made in opposition to one another. The pushed-up material of the surface of the apertured strap 1 forms sharp-edged, scoop-shaped claws with a steep, somewhat hollow side on the side of the pushing-up and an oblique flank on the rear side of the grater gashes 3.1 and 3.2.

Figure 4:
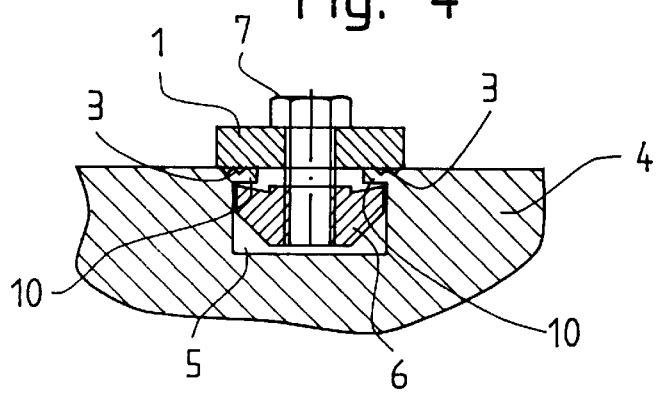
FIG. 4 is a cross-sectional through an executed connection taken along the line 4—4 in the FIG. 5.
Figure 5:
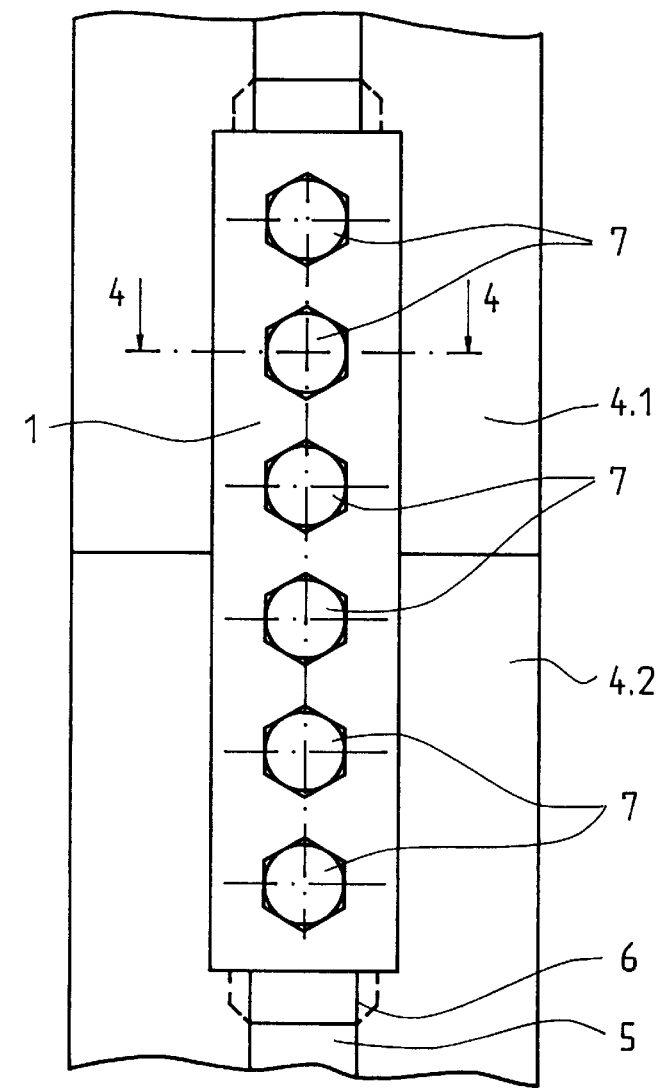
FIG. 5 is a top plan view of an executed connection of two profile members utilizing the apertured strip shown in the FIG. 1 in accordance with the present invention.

The FIG. 4 shows in cross-section, taken along the line 4—4 in the FIG. 5, an executed connection according to the present invention. A normal rectangular mounting groove 5 is hollowed out in an upper surface of a profile member 4. The groove 5 has opposed side walls with side edges or flanges 10 projecting generally horizontally towards the center and flush with the profile member upper surface. There is further recognizable in this illustration how the penetration elements 3 penetrate into the material of the side edges 10. Further, a groove strip 6 is placed in the mounting groove 5, and is engaged by a screw 7 that is utilized to draw the groove strip 6 and the apertured strap 1 together.

The FIG. 5 is a plan view of a connection of the kind according to the present invention of an upper profile member end 4.1 with a lower profile end 4.2. In this view, there are no features of the invention visible from the outside, which results in a neutral view of an apparently normal strap connection. Each of the holes 2 receives one of the screws 7 with the apertured strap 1 and the groove strip 6 extending equally on opposite sides of the abutting profile ends.

Figure 6:
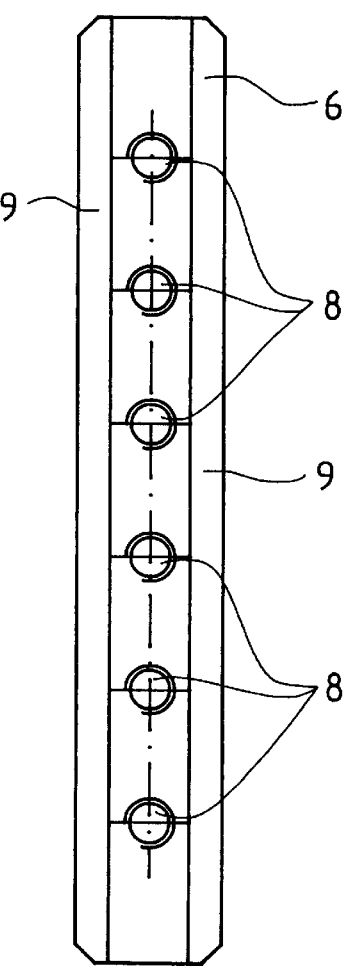
FIG. 6 is a top plan view of the groove strip shown in the FIG. 5.

The groove strip 6, according to the FIG. 6, has a plurality of threaded holes 8 formed therein, which holes are arranged on a longitudinal row and correspond with the holes 2 of the apertured strap.

Figure 7:
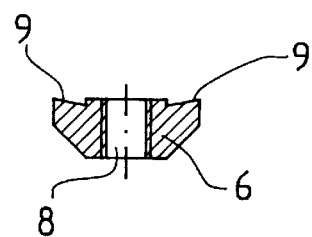
FIG. 7 is a cross-sectional view through one of the holes in the groove strip shown in the FIG. 6.

In the profile cross-section of the groove strip 6 shown in the FIG. 7, the upper side contours are so constructed so that a linear support edge 9 results on opposite sides of and extending generally parallel to the row of holes 8.

In the FIG. 8 there is shown an alternative arrangement of the projecting penetration element 3 with respect to the holes 2 of the apertured strap 1. In this case, the penetration elements 3 are displaced to the right or to the left, with respect to the centerline of the holes 2, by an amount "X" in longitudinal direction. This arrangement of the laterally displaced penetration elements 3 enables, as later described, a second execution of the connection, which is qualitatively equivalent to the first execution.

The use of the connecting equipment according to the invention does not differ from the kind with the usual connecting elements of groove strip, apertured strap and screws. The difference consists, as apparent from the descriptions of the figures, in the special construction of the apertured strap 1 and the groove strip 6. A connection is produced by insertion of the groove strip 6 into the mounting groove 5, abutting together of the profile member ends 4.1 and 4.2, placing the apertured strap 1 with penetration elements 3 directed towards the support surface of the profile members, insertion and loose screwing-in of the screws 7 and subsequent tightening of the screws 7 alternating across the junction of the profile members. Before the tightening of the screws 7, an air gap exists between the support surface of the profile member 4 and the underside of the apertured strap 1. On continuing and alternating tightening of the screws 7, this air gap successively diminishes. There arises a tightening torque that increases with the penetration depth of the penetration elements 3 into the surfaces of the profile members. This causes a sensation of the penetration of the penetration elements 3 in a cold-deforming manner into the profile member material, which transmits itself on use of wrench to tighten the screws 7. When the apertured strap 1 rests on the profile member surface free of gap all round, the tightening process is concluded, which makes itself noticeable by a marked increase of the required screwing torque. The gap-free bearing of the apertured strap 1 on the profile member base at the same time enables a simple visual check of the connecting equipment or allows recognition at a glance whether or not the screws 7 are tightened.

The hardness of the material from which the apertured strap 1 is formed should have approximately twice the value of the material from which the profile member parts to be connected are formed. If the material of the profile member 4 consists of, for example, aluminum, it is sufficient to use a medium hardness steel for the apertured strap 1. In the case of harder profile member materials, the hardness of the penetration elements 3 can be brought to the requisite hardness by, for example, case-hardening.

So that the penetration of the penetration elements 3 into the surface of the profile member 4 is well supported on the underside of the projecting side edges 10 of the mounting groove 5, the penetration elements 3 are arranged along a line on the apertured strap 1, which line coincides with the support edge 9 of the groove strip 6. That gives the advantageous effect that a local deformation through cold flowing takes place only as desired at the penetration locations, without further deformation of the profile member material.

A connection of the described kind can be readily released again, in which case the impression marks caused by the connecting operation are visible in the material of the profile member 4 after the removal of the apertured strap 1. The apertured strap 1 can be used again for a second connection and placed on again in the same manner. In that case, the penetration elements 3 penetrate again, without deformation work, into the impression marks of the previous connecting operation. The renewed connection is qualitatively approximately equivalent to that completed the first time. However, if it is desired that the penetration process in a second connecting operation is repeated as in the case of the first time, an apertured strap according to FIG. 8 can usually be used. In that case, the apertured strap 1, with the arrangement of the penetration elements 3 displaced by the amount "X" relative to the hole center line, is rotated, before placing on the profile member 4, relative to the position in the first connection by 180° about a vertical axis of a plane of the profile member 4 and then, as already described, again screwed tight. The penetration elements 3 now have a position offset relative to the connecting operation of the first time and effect a renewed penetration in cold-deforming manner at new positions, which are not yet deformed, in the profile member material.

The production of the penetration elements 3 is carried out in the same way as the production of rasps with coarse grater gashing. No new devices and tools are needed for this purpose. The process can be automated by appropriate programming of the machine tools used for that.

Shape, number and arrangement of the grater gashes 3.1 and 3.2, in correspondence with different requirements, can be varied and is not limited to the shown example.

In summary, the present invention is a connecting apparatus for the production of a firm, releasable and reproducible mechanical interconnection of two profile member ends 4.1, 4.2 comprising: the groove strip 6 having the plurality of threaded holes 8 formed therein; the apertured strap 1 having the plurality of holes 2 formed therein and the plurality of penetration elements 3 projecting from the support surface thereof; and the plurality of screws 7 whereby when the pair of profile members 4 is positioned with abutting ends 4.1, 4.2 to be connected and each profile member has the mounting groove 5 formed in the upper surface thereof, the groove strip 6 is inserted in the mounting grooves, the apertured strap 1 is placed with the support surface against the upper surfaces of the profile members, each of the screws is inserted through a corresponding one of the apertured strap holes and threadably engages a corresponding one of the groove strip threaded holes, and the screws are tightened, the penetration elements 3 penetrate in a cold-deforming manner into the profile member ends 4.1, 4.2 to be connected.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A connecting apparatus for the production of a firm, releasable and reproducible mechanical interconnection of two profile member ends comprising:

a groove strip having a plurality of threaded holes formed therein and adapted to be removably retained in a mounting groove formed in a surface of a profile member;

an apertured strap having a plurality of holes formed therein and a plurality of penetration elements projecting from a support surface thereof, said penetration elements being offset relative to said apertured strap holes; and a plurality of screws whereby when said groove strip is inserted into a mounting groove of each one of a pair of the profile members positioned with open ends of the mounting grooves abutting, said apertured strap is placed with said support surface against the surfaces of the profile members in which the mounting grooves are formed, each of said screws is inserted through a corresponding one of said apertured strap holes and threadably engages a corresponding one of said groove strip threaded holes, and said screws are tightened, said penetration elements penetrate in a cold-deforming manner into the surfaces of the profile members, and wherein upon release of said screws and rotation of said apertured strap through 180° about a vertical axis of a plane of the profile members, a second connecting operation with new penetration of said penetration elements into the surfaces of the profile members can be made.

2. The connecting apparatus according to claim 1 wherein said penetration elements are formed as grater gashes and are arranged in pairs facing in mutually opposite directions.

3. The connecting apparatus according to claim 1 wherein said apertured strap is formed of a material having at least twice the hardness of the material of which the profile member ends are formed.

4. The connecting apparatus according to claim 1 where said groove strip has a pair of support edges formed thereon for abutment with a pair of projecting side edges formed on side walls of the mounting grooves when said groove strip is inserted into the mounting grooves.

5. The connecting apparatus according to claim 4 wherein said penetration elements are formed along a line which coincides with a support line of said support edge of said groove strip.

6. A connecting apparatus for the production of a firm, releasable and reproducible mechanical interconnection of two profile member ends comprising:

an upper profile member aligned end-to-end with a lower profile member, said profile members being formed of an aluminum material and each having a mounting groove formed in a grooved surface thereof;

a groove strip having a plurality of threaded holes formed therein and being inserted into said mounting grooves;

a longitudinally extending, bar-shaped apertured strap having a plurality of holes formed therein and a plurality of penetration elements projecting from a support surface thereof; and a plurality of screws whereby said apertured strap is placed with said support surface against said grooved surfaces of said profile members, each of said screws is inserted through a corresponding one of said apertured strap holes and threadably engages a corresponding one of said groove strip threaded holes, and said screws are tightened such that said penetration elements penetrate in a cold-deforming manner into said grooved surfaces of said profile members.

7. A connecting apparatus for the production of a firm, releasable and reproducible mechanical interconnection of two profile member at abutting ends comprising:

a groove strip having a plurality of threaded holes formed therein, said groove strip extending into mounting grooves formed in surfaces of a pair of abutting profile members positioned end-to-end;

an apertured strap having a plurality of holes formed therein and a plurality of penetration elements projecting from a support surface thereof; and a plurality of screws whereby when said apertured strap is placed with said support surface against the surfaces of the profile members, each of said screws is inserted through a corresponding one of said apertured strap holes and threadably engages a corresponding one of said groove strip threaded holes, and said screws are tightened, said penetration elements penetrate in a cold-deforming manner into the surfaces of the profile members to releasably connect the profile members.

8. The connecting apparatus according to claim 7 wherein said penetration elements are formed as grater gashes and are arranged in pairs facing in mutually opposite directions.

9. The connecting apparatus according to claim 7 wherein said apertured strap is formed of a material having at least twice the hardness of the material of which the profile member ends are formed.

10. The connecting apparatus according to claim 7 wherein said penetration elements are offset relative to said apertured strap holes whereby upon rotation of said apertured strap through 180° about a vertical axis of a plane of the profile members, a second connecting operation with new penetration of said penetration elements into the surfaces of the profile members can be made.

11. The connecting apparatus according to claim 7 where said groove strip has a pair of support edges formed thereon for abutment with a pair of projecting side edges formed on side walls of the mounting grooves when said groove strip is inserted into the mounting grooves.

12. The connecting apparatus according to claim 11 wherein said penetration elements are formed along a line which coincides with a support line of said support edge of said groove strip.

* * * * *